(12) United States Patent
Mott et al.

(10) Patent No.: US 6,170,060 B1
(45) Date of Patent: Jan. 2, 2001

(54) METHOD AND APPARATUS FOR TARGETING A DIGITAL INFORMATION PLAYBACK DEVICE

(75) Inventors: Timothy Mott, Ketchum, ID (US); Guy Story, New York, NY (US); Benjamin Che-Ming Jun, Palo Alto, CA (US); Samuel Hong-Yen Pai, Carlsbad, CA (US); Paul Kocher, Menlo Park, CA (US)

(73) Assignee: Audible, Inc., Wayne, NJ (US)

( * ) Notice: Under 35 U.S.C. 154(b), the term of this patent shall be extended for 0 days.

(21) Appl. No.: 08/943,582

(22) Filed: Oct. 3, 1997

(51) Int. Cl.[7] .................................................. H04L 9/00
(52) U.S. Cl. ........................ 713/201; 713/160; 713/176
(58) Field of Search .................... 713/160–161, 713/176, 201; 380/236, 237, 259; 707/104; 709/219

(56) References Cited

U.S. PATENT DOCUMENTS

| | | | | |
|---|---|---|---|---|
| 5,126,990 | * | 6/1992 | Efron et al. | 369/58 |
| 5,132,992 | * | 7/1992 | Yurt et al. | 375/122 |
| 5,483,658 | * | 1/1996 | Grube et al. | 395/800 |
| 5,499,294 | * | 3/1996 | Friedman | 380/10 |
| 5,511,122 | * | 4/1996 | Atkinson | 380/25 |
| 5,513,260 | * | 4/1996 | Ryan | 380/3 |
| 5,555,098 | * | 9/1996 | Parulski | 358/341 |
| 5,646,997 | * | 7/1997 | Barton | 380/23 |
| 5,781,723 | * | 7/1998 | Yee et al. | 395/186 |
| 5,918,213 | | 6/1999 | Bernard et al. | . |
| 5,926,624 | * | 7/1999 | Katz et al. | 395/200.47 |
| 5,966,440 | | 10/1999 | Hair | . |

OTHER PUBLICATIONS

Microsoft Press, "Computer Dictionary 2nd Edition", pp. 194–195, 1994.*

* cited by examiner

Primary Examiner—Ly V. Hua
Assistant Examiner—Scott T. Baderman
(74) Attorney, Agent, or Firm—Blakely, Sokoloff, Taylor & Zafman LLP

(57) ABSTRACT

A method, apparatus, and article of manufacture for targeting a digital information playback device. A device ID and or a group ID is embedded in the playback device. A device ID or a group ID is also embedded in a digital information file. Upon receiving the digital information file, the device ID or the group ID of the playback device is compared to that contained in the digital information file. The digital information file is then played if either the device ID or the group ID of the digital information file matches that of the playback device.

27 Claims, 12 Drawing Sheets

METHOD AND APPARATUS FOR TARGETING A DIGITAL INFORMATION PLAYBACK DEVICE

FIELD OF THE INVENTION

The present invention relates generally to a digital information transmission, receiving, and playback system, and more specifically, to a method and apparatus for targeting a digital information playback device.

BACKGROUND OF THE INVENTION

Recent technological advances in the compression of digital data and the expansion of storage capacities of computer systems together with the increased bandwidth of computer network infrastructures have created new possibilities for personalized access to and usage of large amounts of digital information. One form of this type of digital information is audio information delivered across a computer network as digitized information.

In the field of interactive digital information transmission, receiving, and playback systems, several patents are known to the present applicants. U.S. Pat. No. 5,132,992, issued Jul. 21, 1992 to Yurt et al. (Yurt), describes a system of distributing video and/or audio information employing digital signal processing to achieve high rates of data compression. The Yurt patent describes a transmission system including a conversion means for placing the items from a source material library into a predetermined format as formatted data. Audio data is compressed by an audio compressor by application of an adaptive differential pulse code modulation (ADPCM) process to the audio data. Stored items are accessed in the compressed data library through the use of a unique address code assigned to each item during storage encoding. The unique address code is used for requesting and accessing information and items throughout the Yurt transmission and receiving process. The Yurt transmission system includes means by which a user enters a customer identifier (ID) code by which the system accesses the users account, and indicates to the system that the user is a subscriber of the system. If a subscriber is in good standing, the Yurt system delivers selected titles using the described techniques.

One significant problem with the audio transmission and receiving system described in Yurt is the lack of an effective means for ensuring the security of the digital information library and of the items downloaded to a user from the digital information library. Although Yurt describes the use of a unique identification code assigned to items in the library and a customer ID code assigned to particular users, no authentication protocols or encryption techniques are described to prevent the unauthorized creation of clone libraries or the unauthorized download or copying of library items. Secondly, Yurt and related prior art does not describe an authentication or encryption means providing secure transactions between a server based digital information library supporting a client computer system having an interface to a mobile playback device. Thirdly, the prior art does not describe a mechanism for selecting a digital information passage to be previewed. Prior art systems also do not describe a system whereby only part of a program gets downloaded from a client computer system to a mobile playback device depending on how much storage space is available in the mobile playback device. Prior art systems also do not describe a mechanism for specifying multiple programs to be downloaded from a digital information library into a mobile playback device. Prior art systems also do not detail the processes required in the authoring system to generate content for the digital information library. Finally, prior art systems do not describe an accounting system whereby library content providers can perform real-time queries on usage information related to the access of library items.

SUMMARY OF THE INVENTION

The present invention provides a method, apparatus, and article of manufacture for targeting a digital information playback device. A device ID and or a group ID is embedded in the playback device. A device ID or a group ID is also embedded in a digital information file. Upon receiving the digital information file, the device ID or the group ID of the playback device is compared to that contained in the digital information file. The digital information file is then played if either the device ID or the group ID of the digital information file matches that of the playback device.

BRIEF DESCRIPTION OF THE DRAWINGS

The present invention is illustrated by way of example and not limitation in the figures of the accompanying drawings, in which like references indicate similar elements and in which.

DESCRIPTION OF A PREFERRED EMBODIMENT OF THE PRESENT INVENTION

The preferred embodiment of the present invention is a computer network based digital information library system employing authentication, targeting, and encryption protocols for the secure transfer of digital information library programs to a client computer system and a mobile digital information playback device removably connectable to the client computer system. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
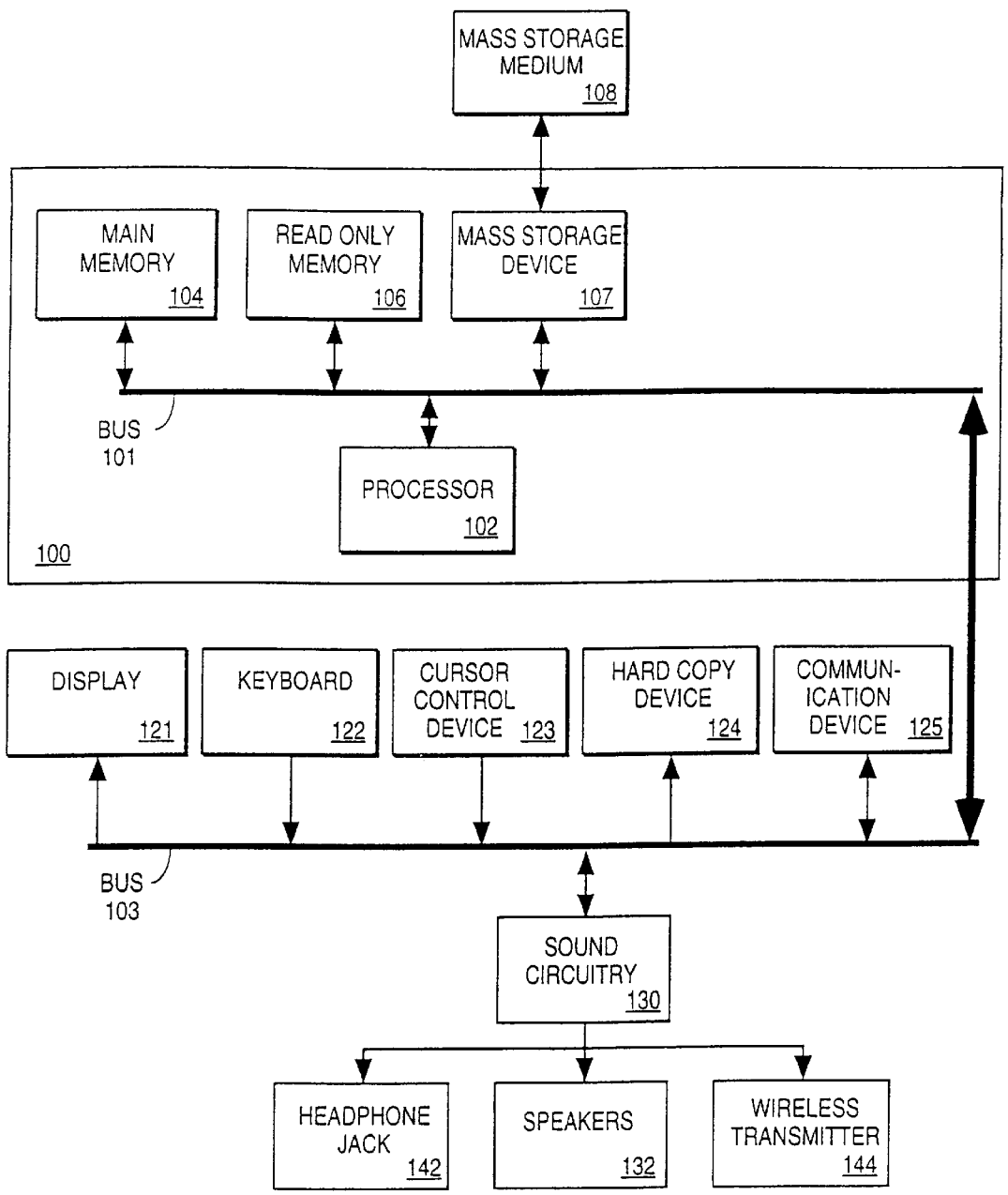
FIG. 1 illustrates a typical computer platform compatible with the present invention.

FIG. 1 illustrates a typical data processing system upon which one embodiment of the present invention is implemented. It will be apparent to those of ordinary skill in the art, however that other alternative systems of various system architectures may also be used. The data processing system illustrated in FIG. 1 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a mass storage device 107 such as a magnetic disk drive or optical disk drive. Mass storage device 107 is coupled to bus 101 and is typically used with a computer readable mass storage medium 108, such as a magnetic or optical disk, for storage of information and instructions. The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control 123, such as a mouse, a trackball, stylus, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. In the preferred embodiment, a communication device 125 is coupled to bus 101 through bus 103 for use in accessing other nodes of a network computer system or other computer peripherals. This communication device 125 may include any of a number of commercially available networking peripheral devices such as those used for coupling to an Ethernet, token ring, Internet, or wide area network. It may also include any number of commercially available peripheral devices designed to communicate with remote computer peripherals such as scanners, terminals, specialized printers, or audio input/output devices. Communication device 125 may also include an RS232 or other conventional serial port, a conventional parallel port, a small computer system interface (SCSI) port or other data communication means. Communications device 125 may use a wireless means of data transfer devices such as the infrared IRDA protocol, spread-spectrum, or wireless LAN. In addition, communication device 125 is used in the preferred embodiment to couple the mobile playback device 212 to the client computer system 214 as described in more detail below. One other device used in the preferred embodiment is sound circuitry 130 either with attached speakers or headphones 132, or with analog audio outputs suitable for input into audio reproduction equipment such as external amplifiers and speakers, cassette adapters, etc. Sound circuitry 130 is well known in the art for playing audio files. Alternatively, sound circuitry may be a radio transmitter which transmits audio data on a predefined frequency for reception and playback by a radio receiver. Other wireless methods are possible.

Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 1 is an IBM® compatible personal computer (PC), an Apple MacIntosh® personal computer, or a SUN® SPARC Workstation. Processor 102 may be one of the 80X86 compatible microprocessors such as the 80486 or PENTIUM® brand microprocessors manufactured by INTEL® Corporation of Santa Clara, Calif.

The software implementing the present invention can be stored in main memory 104, mass storage device 107, or other storage medium accessible to processor 102. It will be apparent to those of ordinary skill in the art that the methods and processes described herein can be implemented as software stored in main memory 104 or read only memory 106 and executed by processor 102. This software may also be resident on an article of manufacture comprising a computer usable mass storage medium 108 having computer readable program code embodied therein and being readable by the mass storage device 107 and for causing the processor 102 to perform digital information library transactions and protocols in accordance with the teachings herein.

Digital Information Library System

Figure 2:
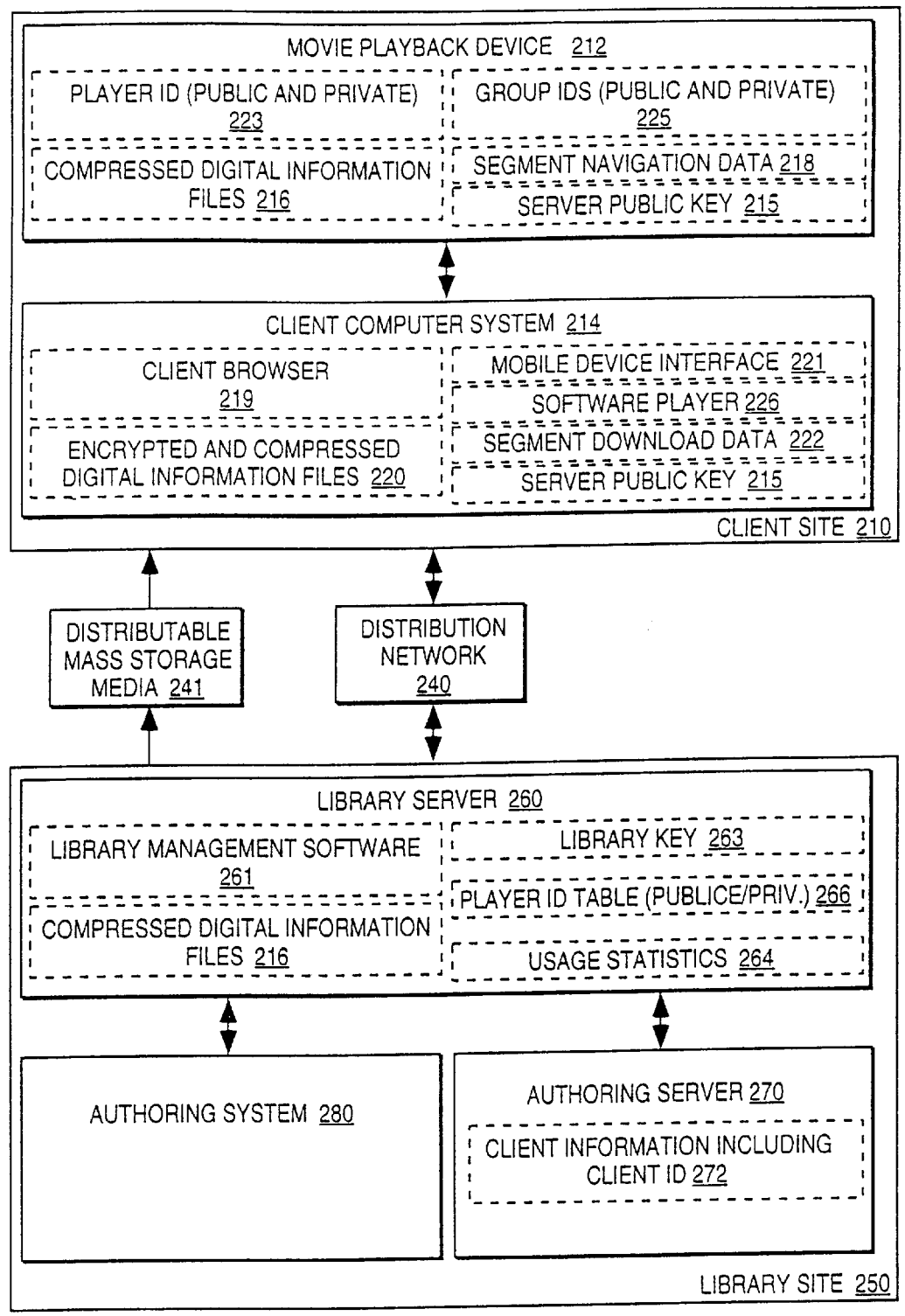
FIG. 2 illustrates a high level block diagram of the computer network based digital information library system compatible with the present invention.

FIG. 2 illustrates the computer network architecture used in the preferred embodiment of the present invention. In general, the network architecture of the present invention includes a library site 250 coupled to a client site 210 via a conventional distribution network infrastructure 240. This conventional distribution network infrastructure 240 can be implemented as a standard telephone connection provided between the library site 250 and client site 210 through an Internet provider to enable data communication on the Internet over a conventional telephone network. This use of the Internet as a distribution network is well known to those of ordinary skill in the art. In an alternative embodiment having cable modem capability, communication over a conventional cable network is possible in lieu of communication over the telephone network. The cable network is typically much faster (i.e. provides a much greater bandwidth) than the standard telephone network; however, cable modems are typically more expensive than standard POTS (plain old telephone system) modems. In another alternative embodiment having conventional Integrated Services Digital Network (ISDN) capability, the distribution network 240 is accessed using an ISDN modem. Again, the ISDN network is typically faster than the POTS network; however, access to an ISDN network is generally more expensive. Cable modems and ISDN implementations are alternative communications media to the POTS implementation.

In addition, it will be apparent to those of ordinary skill in the art that other forms of networking may equivalently be supported by the present invention. For example, a wireless transmission means such as infrared or radio links may also provide the distribution network 240 described in the present application. As an alternative to the Internet, a proprietary network/bulletin board such as AMERICA-ON-LINE (AOL), or COMPUSERVE may be used.

Each of the servers at library site 250 and the client computer system 214 at client site 210 can be implemented as a computer system such as the one described above in connection with FIG. 1. It will be apparent to one of ordinary skill in the art that the library server 260, authoring system 280, and authorization server 270 can be remotely located yet networked together as a distributed system using the techniques described above. In addition, the present invention allows for multiple library servers, authoring systems and authorization servers. Conversely, the servers may be implemented as separate functions of a single machine. These alternative embodiments are illustrated in FIGS. 4–8 and are described in more detail below.

The mobile playback device 212 is a minimally configured, low-cost, standalone mobile unit for receiving and storing digital information files or programs as downloaded by library server 260 and client computer system 214 and for playing back the digital information files or programs for a user of the mobile playback device 212. The mobile playback device 212 is temporarily removably coupled to the client computer system 214 while the download takes place. Once downloaded, the mobile playback device 212 may be detached from the client computer system 214 and used as a standalone digital information playback device. A co-pending U.S. patent application titled, "Interactive Audio Transmission, Receiving and Playback System", assigned Ser. No. 08/490,537, and assigned to the Audible Words Corporation of Montclair, N.J. describes the details of mobile playback device 212 and is herein incorporated by reference.

In its basic form, the preferred embodiment of the present invention is a digital information library system providing selection of digital information programming on demand over a computer network. In an alternative embodiment, the digital information programming is selected via the computer network but delivered using mass storage media 241. This alternative embodiment is described in more detail below.

The digital information library is an indexed collection of digital information programming, drawing content from digital information sources such as books, daily news and entertainment feeds, conferences and educational sources, other computer systems, the host on the World Wide Web (WWW) of the Internet, and customized audio or visual image programming. Other sources of the digital information content include, but are not limited to, conference or seminar proceedings, lecture or speech materials, language lessons, readings, comedy, customized spoken digests and related, "need-to-know" business information, computer software, local sound studio material, text to speech conversion of machine readable files, pre-recorded material from magnetic tape, CD-ROM, digital audio tape, or analog cassette tape. This digital information content is input as raw digital information content to authoring system 280 shown in FIG. 2. In an alternative embodiment, a raw digital information digitizer 307 is included for receiving raw input and converting the input to a digital form which can be manipulated as a digital information file.

In an alternative embodiment, the digital information comprises digitized image or graphics data used to produce visual images on a display screen or projection screen. These images may be included in the digital information retained and maintained by the library server 260.

Authoring System

Authoring system 280 is used to edit, index, compress, scramble, segment, and catalog digital information content into digital information programs in digital information files, which are stored on mass storage media 241 or on library server 260 as scrambled and compressed digital information files 262. The digital information programs are initially categorized according to traditional criteria (e.g. genre, modem fiction, mystery, adventure, romance, non-fiction, classics, self-help, science fiction, westerns, etc.). Categories associated with specific authors or publishers are also provided. Both unabridged and abridged titles are provided. In some circumstances, it may be necessary to digitize digital information content from an undigitized form. The raw information digitizer 307 is provided for this purpose. Authoring system 280 also partitions digital information content into segments, which can be identified, searched, and skipped over if desired. All of these functions are performed by authoring system 280.

Figure 3:
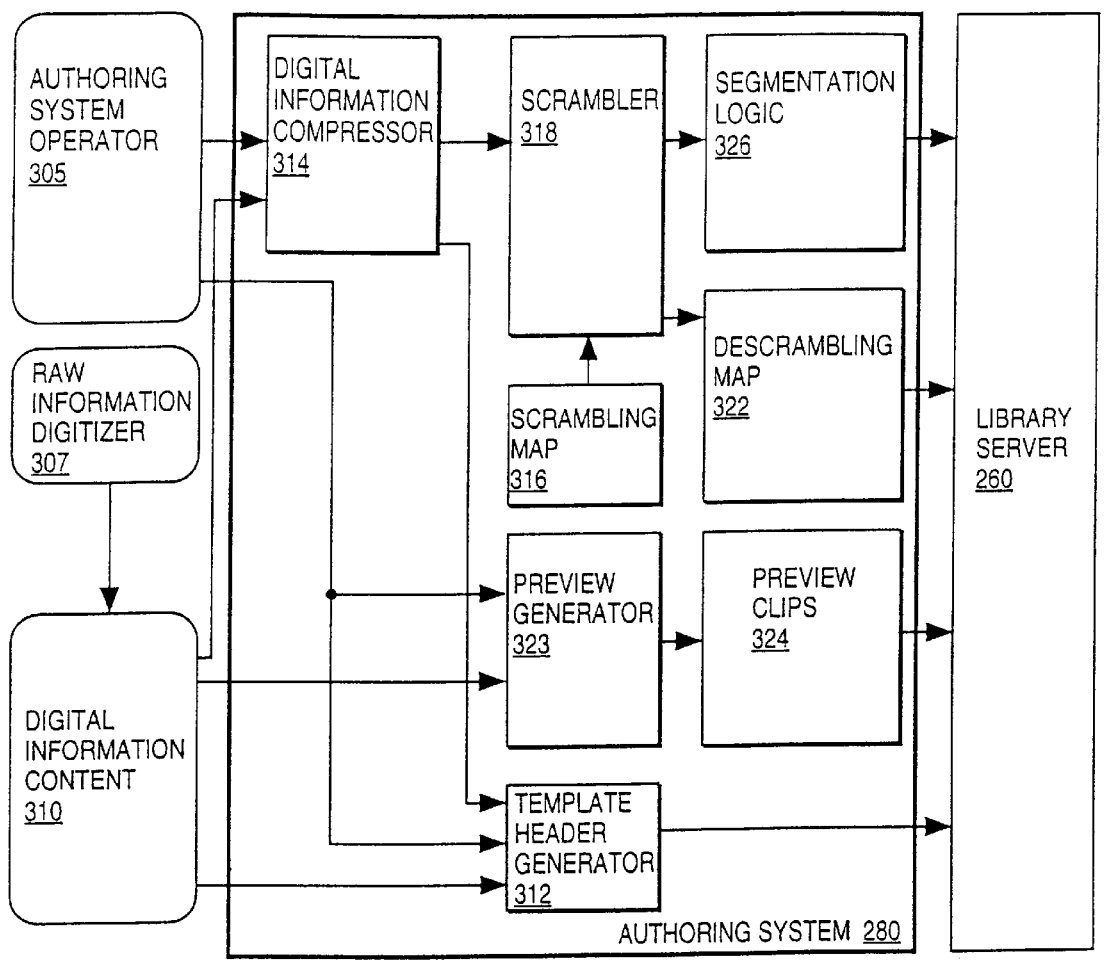
FIG. 3 illustrates a high level block diagram of the authoring system compatible with the present invention.

FIG. 3 illustrates the authoring system 280 of the preferred embodiment. Authoring system 280 receives digital information content from a variety of conventional sources as raw digitized data. This digital information data is fed to three components of the authoring system 280 of the preferred embodiment. The digital information compressor 314 receives the raw digital data and compresses the digitized data. There are a variety of conventional techniques in existence for compressing digital data. These techniques can be optimized depending upon the type of digital data being processed. Thus, the present invention provides several compression methods and a means for the authoring system operator 305 to select between these methods based upon the category of digital information content 310 being input to the digital information compressor 314. Alternatively, the selection of compression method may be performed automatically by interpretation of the digital information content 310 itself. A compressed digital information file is output by digital information compressor 314 to scrambler 318.

The raw digital information content 310 is also fed to template header generator 312. Each digital information file maintained by the library server 260 includes other descriptive information used to identify the file's content and to provide information used to process the digital information within the file. Each digital information file includes a template header, a descrambling map, selected preview clips, and the digital information programming itself. In the preferred embodiment, the template header comprises a number of attributes corresponding to the digital information in the file. For example, the digital information may be audio information generated from the content of a book or other published work. In this example, the audio file template header contains attributes including: 1) the title of a book, volume, or medium from which the digital information content originated, 2) the legal copyright associated with the digital information content, 3) audible title(s) of the content, 4) a table of contents of the content, and 5) playback settings for appropriately playing or rendering the digital information. The table of contents contains content navigation information including but not limited to: the number of chapters, the length of the program, and information indicative of the relevant content sections. The table of contents is generated with input from authoring system operator 305 or automatically by analysis of digital information content 310. The descrambling map 322 is used to interpret the digital information after the digital information has been scrambled by scrambler 318 as described below. The preview clips 324 comprise short pre-generated portions of digital information content used to give a consumer a sense of the content of a particular digital information file. In the preferred embodiment, these previews are generated as conventional formatted files which can be directly played by sound generation circuitry 130 or rendered by other means. A digital information file can have several preview clips associated with it. The preview clips 324 are not compressed or scrambled in the preferred embodiment. The template header 312 remains with the digital information file as it is transferred to the network 240 or mass storage media 241. The other descriptive information related to a digital information file is typically stored with digital information file, but is not required to be so stored.

Referring again to FIG. 3, template header generator 312 generates the template header given information from a particular portion of digital information content 310. Input from Authoring System Operator 305 and Digital Information Compressor 314 may be solicited during the header generation process. The template header is provided to library server 260. Other portions of the digital information file header are provided by scrambler 318 and preview generator 323. These portions of the digital information file header are assembled into the header for a particular digital information file by library server 260. The remainder of the digital information file is filled with compressed, scrambled, and segmented digital information content.

After digital information compressor 314 has compressed the raw digital information using a selected compression method suitable for the category of digital information, the scrambler 318 scrambles the digital information. The digital information is scrambled to prevent an unauthorized consumer from using the digital information. In the preferred embodiment, scrambler 318 uses a conventional encryption method to render the data unusable. A corresponding descrambling map 322 is generated to provide a means for descrambling the scrambled digital information file. A scrambling map 316 is used by scrambler 318 to scramble the digital information file. The scrambler 318 can encrypt the entire digital information file or selected critical subsets of the digital information file. The level of scrambling can be selected depending upon the capabilities of the authoring system 280, the mobile playback device 212 and/or the anticipated software player 226 on client computer system 214. In an alternative embodiment, a proprietary digital information format is used in lieu of scrambler 318.

The scrambled digital information content is output by scrambler 318 to segmentation logic 326. Segmentation logic 326 partitions the digital information content into blocks for efficient storage in and transfer to a mobile playback device 212 or software player 226 and for efficient navigation during playback. Transport integrity data is generated and appended to the segmented digital information. In an alternate embodiment, portions of the segmentation process may take place before or after digital information compressor 314 and scrambler 318. Segmentation information may also be used in the header generation process by template header generator 312. The compressed, scrambled, and segmented digital information blocks are provided to the library server 260 by authoring system 280. Library server 260 assembles the segmented digital information blocks, the descrambling map 322, the preview clip(s) 324, and the template header 312 for a particular item of digital information content into a digital information program file or files, which are stored in a digital information program file storage area 262. Other raw digital information content is converted into digital information files using the authoring system 280 in a similar manner.

Library Server

Referring again to FIG. 2, the library server 260 is responsible for maintaining the digital information program files 262 created by the authoring system 280. In addition, the library server 260 receives requests for access to the digital information program files 262 from client computer systems 214 over network 240 and manages purchase and delivery of the selected digital information files and/or delivery of selected preview clips 324. The library server 260 includes library management software 261 for performing these library server functions and a library key 263 used for the authentication protocol described below. Library management software 261 includes processing logic for receiving and responding to client computer system 214 requests for access and/or purchase of a digital information program file 262. Upon receiving such a client request, library server 260 uses authorization server 270 to authenticate the request with client information 272 generated and maintained by library server 260 or authorization server 270. The client information 272 includes client identifiers which are used to target content for playback on individual mobile playback devices 212 or software players 226. Client information 272 may also contain client personal information, user content preferences, client billing history, player usage history, and player group lists. In an alternative embodiment, portions of client information 272 may instead be stored in server 260. Using the authorization protocol described in more detail below, the library server 260 determines if the client request can be serviced. If approved, the library server 260 accesses the digital information program file(s) or preview clip(s) requested by the client computer system 214, delivers the selected preview clip(s) or builds encrypted, targeted, and digitally signed digital information files using the authentication protocol described in more detail below, and transfers the encrypted and compressed digital information file(s) to the requesting client computer system 214 via network 240. Distributable mass storage media 241 may also be used as a delivery medium for the transfer of information to client system 214. The client computer system 214 may then independently download the selected digital information files (or a subset thereof) into the mobile playback device 212 for subsequent playback. The library server 260 also collects usage statistics on the access history of the digital information files 262 and stores this usage data into usage statistic storage area 264. The library server 260 also stores operating code segments (firmware) for the client browser 219, software player 226, and for mobile playback device 212. This operating code can be downloaded to the client computer system 214 in the same manner as digital information files are transferred. Player configuration data for playback device 212 and software player 226 is stored on the library server 260 and can be customized or updated in the same manner as digital information files and firmware are transferred. Configuration data includes, but is not limited to, audio prompts, user interface options, group ID information, and information playback parameters. Player configuration data is transferred to client computer system 214, software player 226, or mobile playback device 212 as required according to client information 272.

The library server 260 interfaces with a client application program or client browser 219 executing on client computer system 214. The client browser 219 is used to make requests of library server 260 for various types of service including, but not limited to, searching the digital information files 262 for a desired program, previewing a selected preview clip associated with a digital information file 262, purchasing a selected program, requesting operating code segments or player configuration data, and downloading the purchased program or other material to the requesting client computer system 214.

The library server 260 interface with the authorization server 270 and client computer system 214 uses the unique authentication protocol and encryption protocol of the preferred embodiment of the present invention. The preferred embodiment of these protocols is described in the sections below.

Client Computer System

Referring again to FIG. 2, the client computer system 214 represents a consumer or end user computer system, typically a personal computer, such as the sample system illustrated in FIG. 1, with which a consumer may browse, preview, select, purchase, and take delivery of digital information content from digital information library server 260 across distribution network 240. Client computer system 214 comprises client browser software 219, a mobile device interface 221, storage for encrypted and compressed digital information files 220 downloaded from the network 240, software player 226, and segment download data 222 derived from digital information files 220 for defining the storage segments in mobile playback device 212 and for assisting in the downloading of digital information files 220 from client computer system 214 to mobile playback device 212. Client computer system 214 also includes a server public key 215 used for authenticating digital information and software files received from server 260. Client browser software 219 provides the control logic with which the client or consumer accesses and purchases titles from the digital information library 262 of library server 260. Client browser software 219 also provides control logic which requests and downloads configuration information or operating code from server 260. The client browser software 219 can be configured to perform these operations without direct human intervention. The mobile device interface 221 is a software interface used to control the transfer of control information, operating code, and digital information files from client computer system 214 to mobile playback device 212. Encrypted and compressed digital information files 220 are received by client computer system 214 from library server 260 over network 240. In an alternate embodiment, distributable mass storage media 241 is used instead of network 240 to transfer information to client computer system 214. The software player 226 is a software module used to emulate the operation of mobile playback device 212 and for playing digital information files through the sound circuitry 130 and audio output device 132 of client computer system 214. Operating code and configuration information for the software player 226 can be downloaded or updated from the server 260 in the same manner as the mobile playback device 212 can be downloaded or updated. The software player 226 functionality is the equivalent of the functionality and operation of the mobile playback device 212. Thus, the use of the term "player" throughout this document generally applies to both the mobile playback device 212 and software player 226. Software players 226 are assigned unique player IDs and can be assigned group IDs that function similarly to IDs assigned to mobile playback devices 212.

Mobile Playback Device

The mobile playback device 212 converts a digital information file into sound or displayable imagery which is played through audio output means or displayed on a display device. In the preferred embodiment, the mobile playback device 212 is a minimal capability, low-cost device primarily dedicated to playing audio files or displaying visual images or text on a display device. The mobile playback device 212 is minimally configured to retain its light-weight, low cost, and readily mobile features. The preferred embodiment does not therefore include the use of a portable personal computer or laptop computer as the mobile playback device 212; because, such general purpose computing devices typically do not meet the light-weight and low cost constraints of the preferred mobile playback device 212. Such general purpose computing devices typically have unnecessary functionality, more complicated interfaces, and may suffer cost and performance penalties in comparison to the special purpose mobile playback device 212. In the preferred embodiment, the mobile playback device 212 includes a processor, memory, and an interface to client computer system 214 over which compressed digital information files 216 are received. As described in more detail below, mobile playback device 212 also includes a player ID 223, group IDs 225, and server public key 215 used for authenticating digital information and software files received from server 260 via client computer system 214. The user controls the mobile playback device 212 using buttons and knobs provided on the device. These controls are used to navigate through digital information files 216, adjust configuration data and playback parameters, or perform other functions as directed by firmware stored in playback device 212. When coupled to the player, client computer system 214 or other electronic devices can solicit user input from these controls. In an alternative embodiment, a set of additional user controls is provided on a remote control unit that is coupled to the player via a wired or wireless connection. Digital information output may be provided via a headphone jack, on board speaker, or wireless transmitter to a separate wireless receiver with speakers or headphones. Audio level can be adjusted with a volume knob. A wireless transmitter may contain an adjustment knob to adjust the transmission frequency or other transmission parameters. Visual information output is provided via LCD display, LED display, or outputs to a standard visual display device. The mobile playback device 212 contains a limited quantity of non-volatile memory, RAM, and ROM. Digital information content, configuration data, and operating code are stored in the memory space of the mobile playback device 212. Configuration data includes but is not limited to: public and private IDs, content playback parameters, and user interface parameters. The use of non-volatile memory allows portions of the digital information content, configuration data, and firmware to be updated via download. Both digital information content and firmware (operating software) is stored in this memory device. Portions of the firmware and configuration information are stored permanently in a read only memory (ROM). An internal memory allocation method is used to track the content of mobile playback device 212 memory. This allocation method, in conjunction with segment navigation data 218, also provides the means for locating desired digital information, program, configuration data, or header data resident in the mobile playback device 212 memory. The mobile playback device 212 includes an interface to the client computer system 214 through which the mobile playback device 212 receives compressed digital information files 216, software updates, and configuration changes from client computer system 214.

Downloading Digital Information Content, Software Updates, or Configuration Information From the Library Server to the Client Computer System The client browser software 219 of client computer system 214 operates in cooperation with library management software 261 of library server 260 and the firmware resident on the mobile playback device 212 to provide a means by which a consumer may browse, preview, select, purchase, and take delivery of selected digital information content from digital information library server 260 across distribution network 240. The digital information content is typically downloaded to the client computer system 214 at the time of purchase, but it is possible to download digital information content either, 1) sometime after the purchase, or 2) multiple times after an initial purchase. The client browser 219 can be configured to download content to client computer system 214 without user intervention. In addition, portions of the client computer system 214 software itself or mobile playback device 212 resident software/firmware may be downloaded or updated from library server 260. The mobile playback device 212 resident software/firmware is downloaded through client computer system 214. If library server 260 has an updated or more recent copy of client computer system 214 software or mobile playback device 212 software/firmware, the library server copy is downloaded to replace the outdated version of the corresponding client computer system 214 software or mobile playback device software 212. The software is encrypted, scrambled, and digitally signed in a manner similar to the scrambling and delivery of the digital information files. Changes to the ID list, audio prompts, and other configuration data for playback device 212 can be downloaded in a manner similar to the downloading of software updates from library server 260.

The preferred embodiment utilizes three authentication processes to protect the transfer of information from server 260 to client system 214 and playback device 212. First, a point-to-point authentication protocol is performed whereby the library server 260 must verify that the requesting client computer system 214 is an authorized client and the client computer system 214 must verify that the library server 260 is an authorized provider. Secondly, a targeting protocol is performed whereby the library server 260 utilizes a set of identifiers (i.e. player IDs) for mobile playback devices 212 authorized to receive the selected download data from library server 260. The mobile playback device identifiers are provided by client computer system 214 or are referenced from user profiles stored on library server 260. In the targeting process, library server 260 formats and downloads data that can only be read or played by mobile devices 212 with these identifiers. Thirdly, a library server digital signature is appended to the downloaded data for use by the mobile playback device 212 to verify that the downloaded data was originated by an authorized library server and to verify the integrity of the downloaded data. These three authentication processes of the present invention are described in detail in the following sections.

Point-to-Point Authentication Protocol

The library server 260, client computer system 214, and mobile playback devices 212 each have a unique verification sequence which is used to verify the authenticity of another system. In communications between library server 260 and client system 214, both systems alternately act to (1) request verification of the other system and (2) provide an authenticating response to a verification request. Communication between mobile devices 212 and client computer system 214 use a similar authentication protocol, as well as real-time communication between mobile devices 212 and library server 260 via client system 214. This verification sequence comprises a pre-defined set of bit streams or data structures which are sent by the requesting system (i.e. the system requesting verification) to the receiving system being authenticated (i.e. the respondent) in a point-to-point transmission. The receiving system must respond to the verification sequence in a pre-defined manner by sending particular response bit streams or data structures to the requesting system. If the appropriate response data from the respondent is received by the requesting system, the system being verified is considered an authorized system. Conversely, the system being verified is considered unauthorized if the appropriate response data is not received by the requesting system prior to a pre-defined time-out period. Both systems begin communication by acting as requesters and respondents in separate verification cycles. Upon completion of these point-to-point authentication cycles, further client/server processing only continues if both systems deem each other to be authorized systems.

In an alternate embodiment, point-to-point authentication is used in a subset of the communications among library server 260, client computer system 214, and mobile playback devices 212. In another embodiment, point-to-point authentication is not used and system security rests on the use of targeting and/or digital signature authentication.

Targeting Protocol

The targeting protocol of the present invention is a means and method for limiting the playback of digital information content, the adjustment of player configuration data, and the download of player operating code to a specified player 212/226 or a specified set of mobile playback devices 212. Each player 212/226 contains a unique player ID 223. The player ID 223 comprises a public player ID and a private player ID. The public player ID is a unique identifier and serves as a serial number for player identification. The private player ID is used to target data for individual mobile playback devices 212. Private player IDs are never sent through any communications link or network path, except during installation. In the preferred embodiment, private player IDs should be sufficiently diverse, but need not be unique.

Mobile playback devices 212 may be logically grouped together using a Group ID. Digital information content, software, or configuration data changes may be targeted to a group of mobile playback devices 212 defined by a group ID. Each player 212/226 includes memory space for storage of one or more group IDs 225 of which the particular player 212/226 is a member. Each group ID includes a public portion and a private portion, each of which is equivalent to the public and private player IDs, respectively. Each group is identified by a uniquely valued public ID that is not shared with other player or group IDs. Digital information content, software, or configuration data can be targeted to a particular group ID in the same way as it would be targeted for a specific player ID. Mobile playback devices 212 in the same group share the same Group ID. A particular Group ID is pre-defined as the global group to which all mobile playback devices 212 are a member. Mobile playback devices 212 may be members of more than one group. A particular player 212/226 is added to a new group by appending the new group ID to the set of group IDs 225 maintained in the particular player 212/226. The new group ID is appended after the server 260 provides a public group ID and a group key to the player 212/226 via client computer system 214. The player 212/226 generates a private group ID from the combination of the group key and the mobile playback device's 212 private player ID. As with the private player ID, the private group ID is never sent through any communications link or network path, except during installation. In an alternative embodiment, players receive the group private ID directly or by combining the group key with the players public ID or other known numeric value. In another alternative embodiment, the private group ID is not used in the targeting process and is not transferred to the player. The group assignment process may be restricted to using real-time communications between server 260 and the player via client system 214, or it may take place sometime after group assignments have been downloaded to client system 214. Having described the player IDs and group IDs defined in the present invention, the use of these IDs in the targeting protocol is described next.

Library server 260 includes a player ID table 266 as shown in FIG. 2. Player ID table 266 includes a storage area for private IDs and public IDs. The private IDs are preloaded into player table 266 when a new mobile playback device is installed into the system or when a new group is established. In another embodiment, ID table 266 is a mathematical function which converts group or player public IDs. Public player and group IDs are sent by a client computer system 214 to the server 260 when the client computer system 214 desires to target a particular player 212/226 or set of mobile playback devices 212 to a particular specified digital information, software content, or configuration data selection. Digital information selection is made from the files 262 stored on library server 260. Software or configuration data selection is made from files stored on server 260 or from data generated upon request by server 260. Software content and configuration data is prepared and scrambled in a manner similar to the authoring process for digital information content. Once an association is made by client computer system 214 between a set of targeted public IDs and the associated data to be transferred from server 260, library server 260 creates a targeted header for the selected files. The library management software 261 consults the public ID to private ID table 266 to locate the corresponding targeted private ID(s). The targeted header comprises a combination of the descrambling map 322 from the selected files with the private player IDs corresponding to the targeted mobile playback devices 212. The descrambling map 322 is thereby encrypted using the secret IDs of the targeted mobile playback device(s) 212. This targeted header is linked with the corresponding digital information or software content of the selected file in a network transport ready data block. A digital signature is applied to the data block as described below in connection with the data signature protocol. Transport integrity data (such as the use of checksums or cyclic redundancy check) is applied to the data block and the data block is sent to the client computer system 214 via network 240. Because the data block can only be unscrambled using the corresponding descrambling block 322 in its header and because the descrambling block 322 was combined (i.e. encrypted) with a private ID known only by the targeted mobile playback device(s) 212, only the targeted mobile playback device(s) 212 will be able to unscramble and read the data block. The selected digital information, software content, and configuration data is thereby targeted to a particular set of mobile playback devices 212.

For small groups of mobile playback devices 212, each targeted header of a digital information file may contain a plurality of descrambling maps, each associated with a different player 212/226. In this manner, multiple mobile playback devices 212 can read a single file 220 stored on the client computer system 214.

A person of ordinary skill in the art will note that alternative methods of targeting exist. In an alternative embodiment, library server 260 uses the targeted recipient's private player 212/226 identifier or the targeted group's private group identifier to generate scrambling map 316. Descrambling map 322 is not stored with the file as it is already known by the recipient player or group. This method targets content to a single player 212/226 or group and achieves the identical result of preventing unauthorized playback of content.

In another alternative embodiment, library server 260 does not scramble the digital information content or uses a known key to scramble the digital information content. In this embodiment, descrambling map 322 is unnecessary and is not stored with the file. Either the public or private player 212/226 identifier can be stored in the header for targeting identification purposes. Upon receipt of data from library server 260, the player 212/226 checks if its player 212/226 identifier or group identifier is included in the header. This method assumes unmodified mobile playback devices 212 and achieves the identical result of preventing unauthorized playback of content.

In another alternative embodiment, the player IDs for the targeted mobile playback devices 212 are sent to the library server 260 by the client computer system 214 when the user registers with the library server 260 to obtain the user's client ID. In this alternative embodiment, these player IDs are stored on the library server 260 in a user profile. In this embodiment, the library server 260 manages the player IDs for the targeted mobile playback devices 212.

Digital Signature Protocol

The third authentication protocol used in the present invention is the digital signature protocol. For selected data blocks generated by library server 260 and downloaded to a client computer system 214, library server 260 uses its private library key 263 to apply a digital signature to the data block. The digital signature comprises a known bit string or data pattern which is combined with the data in data blocks that are downloaded from library server 260 to client computer system 214. The library server 260 may perform this operation on all the data blocks or a selected subset of the data blocks. After a data block is downloaded to a player 212/226 through a client computer system 214, the player 212/226 can retrieve the digital signature applied by the library server 260 using a public server key known to the player 212/226. The player 212/226 can thereby verify that the data block originated with an authorized library server 260, and also verify the integrity of the data block. The public server key is also known to client computer system 214, which can perform the identical operation to verify that the data block originated with an authorized library server 260. In this embodiment, library server 260 performs signatures on the content. A person of ordinary skill in the art would realize that the signatures may also be performed on the digital information by authoring system 280. The signatures may also be performed in a multiple step process shared by authoring system 280 and library server 260.

In an alternate embodiment, digital signatures are applied to downloaded material by a trusted client computer system 214. In another alternate embodiment, digital signatures are not applied to downloaded material and system security rests on the use of targeting and/or point-to-point authentication.

Downloading Digital Information Content, Software Updates, or Configuration Information From the Client Computer System to the Mobile Playback Device In a first step, the client computer system 214 and the mobile device use the point-to-point authentication protocol described above to verify that an authorized mobile playback device 212 is communicating with an authorized client computer system 214. If this is the case, the mobile playback device 212 transmits its memory map to the client computer system 214 via the mobile device interface 221. A table of contents defining the available digital information files 220 and player configuration profiles resident in client computer system 214 is displayed along with the mobile playback device 212 memory map for a user of client computer system 214. The user selects which files 220 of client computer system 214 should replace portions or segments of specified mobile playback device 212 memory as defined by the mobile playback device 212 memory map. Alternately, client browser 219 can be configured to automatically perform this selection process. In either case, the user is prevented from selecting digital information content larger than the available memory of playback device 212. In addition, control software and/or configuration data for playback device 212 may be automatically updated by client computer 214. The specified digital information files 220, associated headers, operating code, or configuration data are thereafter downloaded into mobile playback device 212 memory. The mobile playback device 212 uses checksums to verify the integrity of the download. The mobile playback device 212 uses the server public key 215, the header, and the digital signature to authenticate the download as described above. The header descrambling map is used by targeted mobile playback devices 212 to unscramble the downloaded data. In other embodiments, mobile playback device 212 may unscramble the downloaded data and/or decompress the downloaded data before authenticating the signature. Each segment of the digital information content may be independently authenticated and validated using any of the techniques described above. Digital information prompts on the mobile playback device 212 guide the user to the desired portion of the downloaded digital information content as specified by the table of contents residing in the header of the downloaded data. The user may preview selected portions of the digital information content by selecting a preview option. The preview option plays a predetermined portion of a selected digital information program. Upon selection of a particular digital information program, the selected digital information program is played for the user after the mobile playback device 212 converts the digital information content into sound or displayable imagery which is played through an audio output means or displayed on a display device.

The software player 226 of client computer system 214 may also receive digital information content in approximately the same form as the digital information content downloaded to the mobile playback device 212; however, the digital information content for the software player 226 does not need to be downloaded to the software player 226. The software player 226 has direct access to the digital information content; because, it shares memory and/or disk storage space with the client computer system 214. Therefore, there are no downloading or memory map concerns. In the same manner as the mobile playback device 212, the software player 226 performs digital signature verification, verification of checksums, and receiving targeted information. In an alternative embodiment, software player 226 may use a communication protocol similar to that of mobile playback device 212 when receiving digital information content, configuration information, and dynamically downloaded software.

Figure 4:
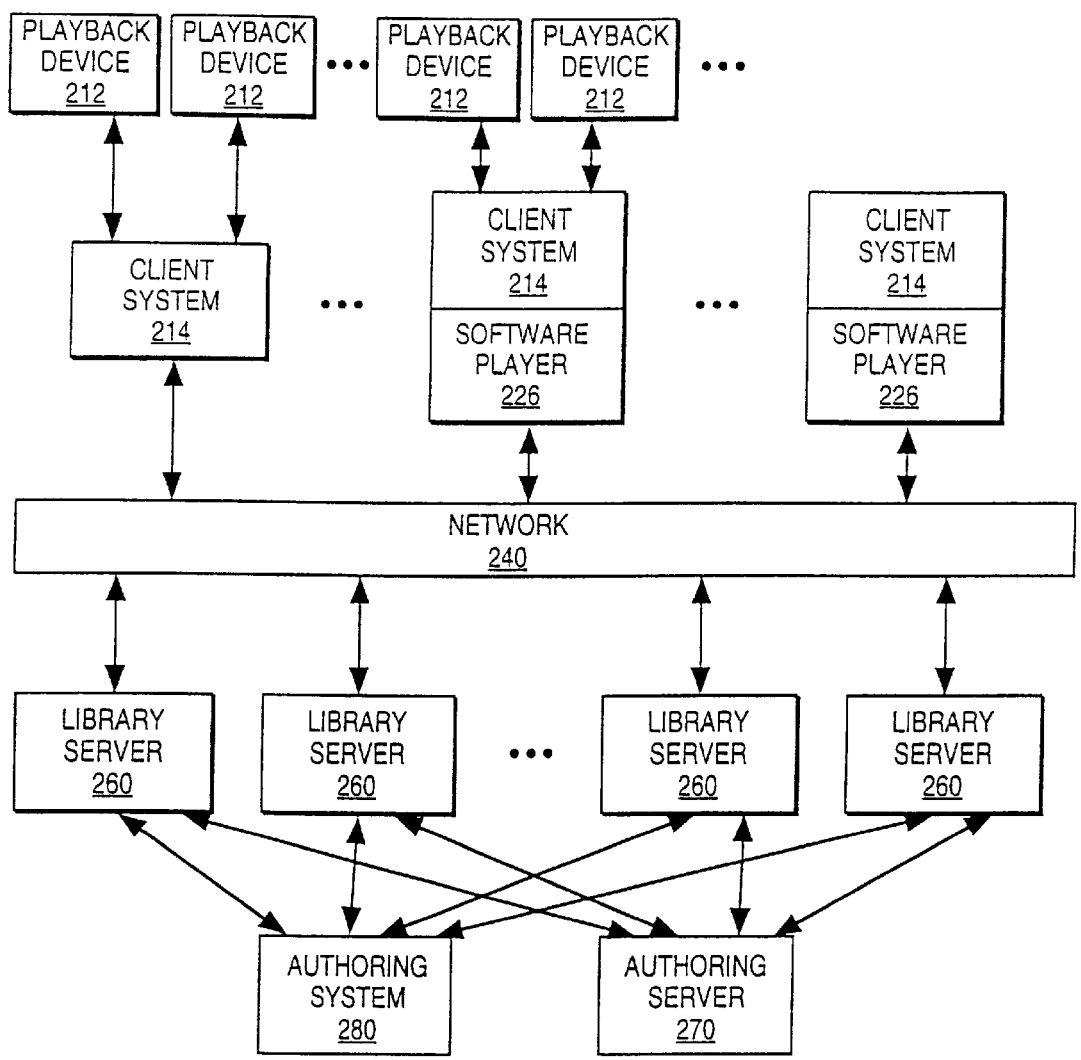
FIG. 4 illustrates an alternative embodiment having a plurality of library servers.

FIG. 4 illustrates an alternative embodiment of the present invention. As shown in FIG. 4, authoring system 280 can support a plurality of library servers 260. Each library server can be configured to support a specific type of digital information content. In the same manner described above, the client computer systems 214 access network 240 and obtain digital information content from any of the library servers 260 after performing the authentication process described above. Authorization server 270 is provided for this purpose. The configuration illustrated in FIG. 4 provides a more distributed architecture thereby dispersing the load across several server platforms. A site with many client computer systems 214 may have its own library server 260 to reduce demand on network 240. This architecture scales well as the number of client computer systems 214 grows and the content provided by the library server 260 grows.

Figure 5:
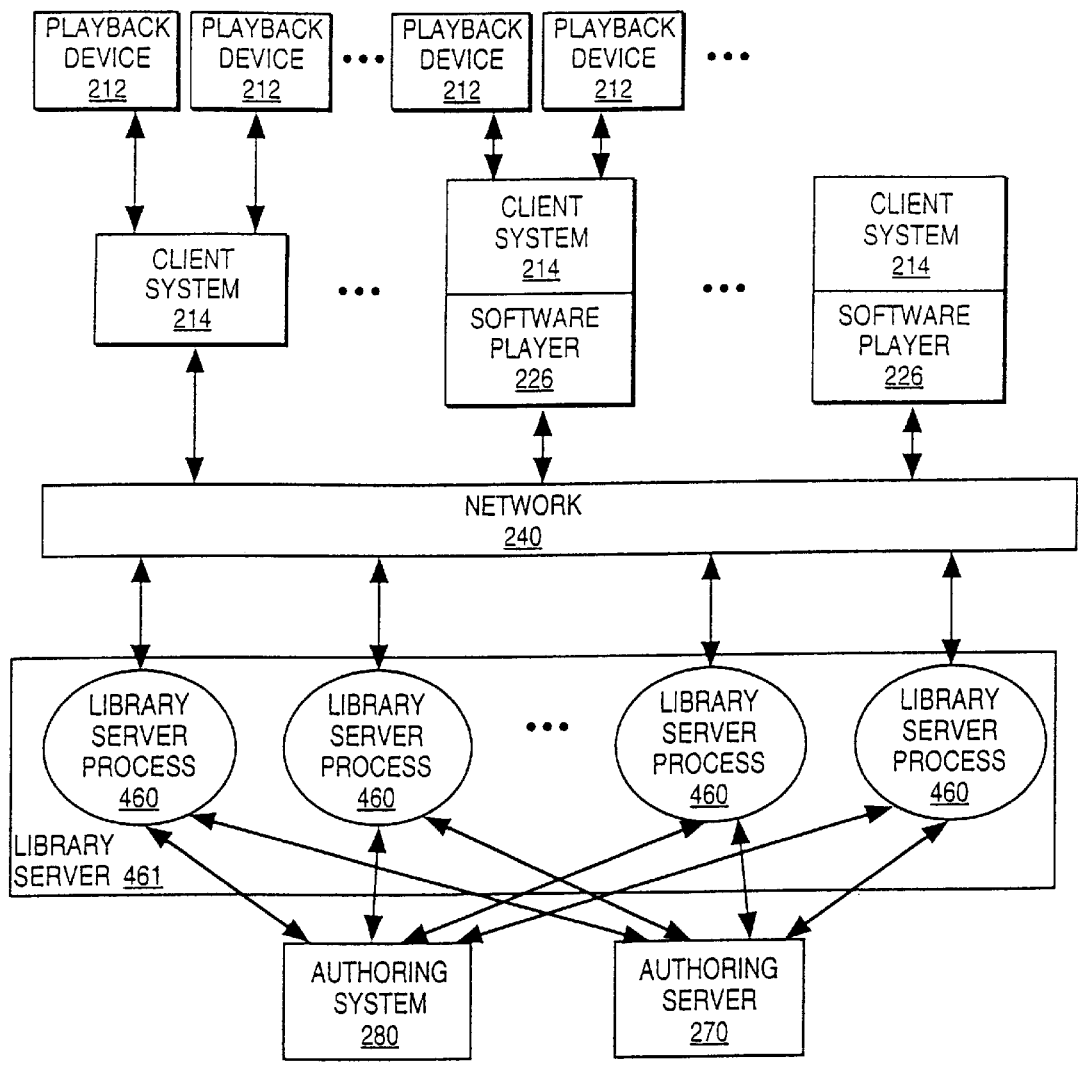
FIG. 5 illustrates an alternative embodiment having a plurality of library server processes.

FIG. 5 illustrates another embodiment of the present invention except the library server 461 has been implemented as a plurality of separate processes or tasks 460 running concurrently on a single library server platform 461. Each library server process 460 services requests for access to its corresponding portion of the digital information content. This content is created using authoring system 280 in the manner described above. The authorization server 270 is used to validate the links between the client computer systems 214 and the library server processes 460. The configuration illustrated in FIG. 5 is advantageous in that the convenience of a single server is maintained while the scalability of multiple libraries is also supported.

Figure 6:
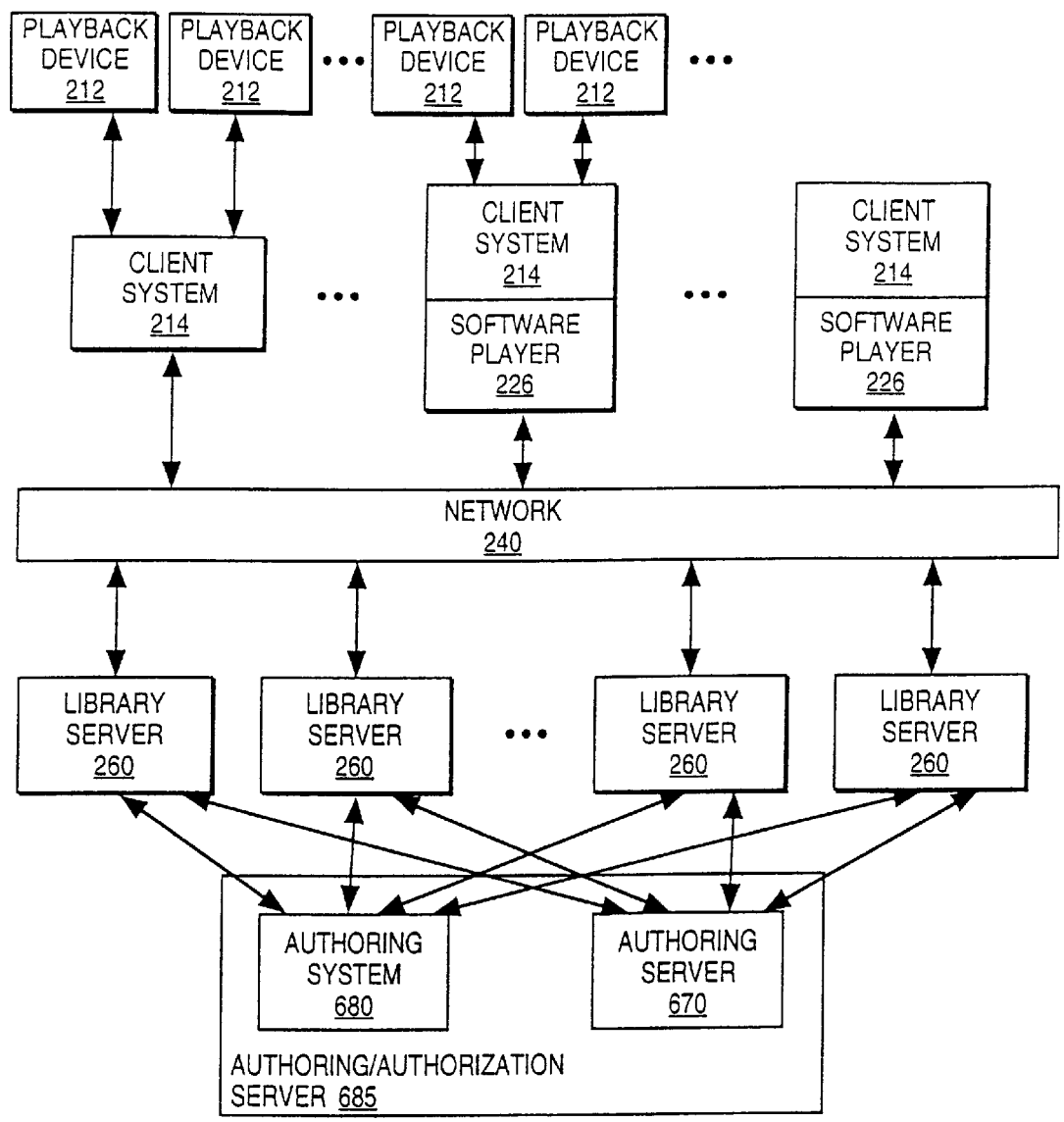
FIG. 6 illustrates an alternative embodiment having a single authoring/authorization server.

This concept can also be used for the authoring and authorization servers 280 and 270, respectively. As shown in FIG. 6, the authoring system 280 and the authorization server 270 is implemented on a single platform 685 as authoring process 680 and authorization process 670. These processes perform the same functions as described above, except the implementation provides the convenience of a single server and the scalability of multiple processes for the authoring and authorization tasks.

Figure 7:
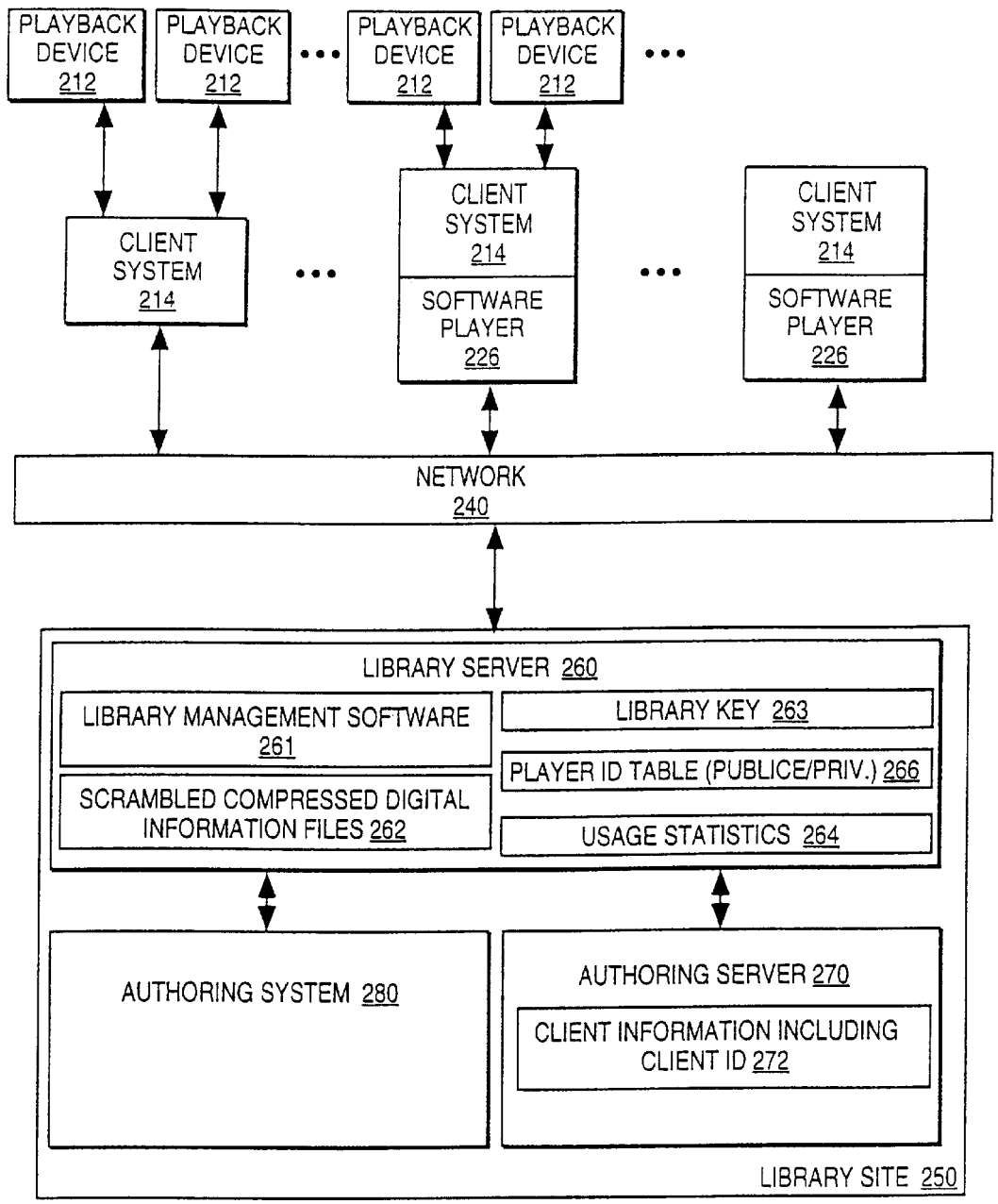
FIG. 7 illustrates an alternative embodiment wherein client computer systems have a local library.

FIG. 7 illustrates yet another alternative embodiment wherein the client computer systems 214 include a local library 710. The local library 710 provides a local storage area and library access control functionality which provides access to a subset of the archived digital information from library server 260. In the manner described above, the user of a client computer system 214 identifies the titles or items of digital information in library server 260 that the user wishes to access. In the preferred embodiment, these content selections are transferred to a client storage area 220 (as shown in FIG. 2) for subsequent downloading to mobile playback device 212. The embodiment shown in FIG. 7 expands upon the client storage area 220 and creates a local library 710. The local library 710 is used for storage of selected content; but also for searching, sorting, categorizing, and abstracting the locally stored content. The local library 710 allows a client computer system 214 to maintain a small subset of the full library which may be used to create custom collections of content in a variety of user selected configurations. Client systems 214 may be permitted to access the contents of local libraries 710 on other client systems 214. In a related alternate embodiment, library server processes 460 may also reside on selected client systems 214. This embodiment allows client systems 214 to browse and purchase content that is scrambled, targeted, and delivered from library server process 460 executing on a locally positioned client system 214. By maintaining the library locally, a portion of the network access and transfer overhead is eliminated.

Figure 8:
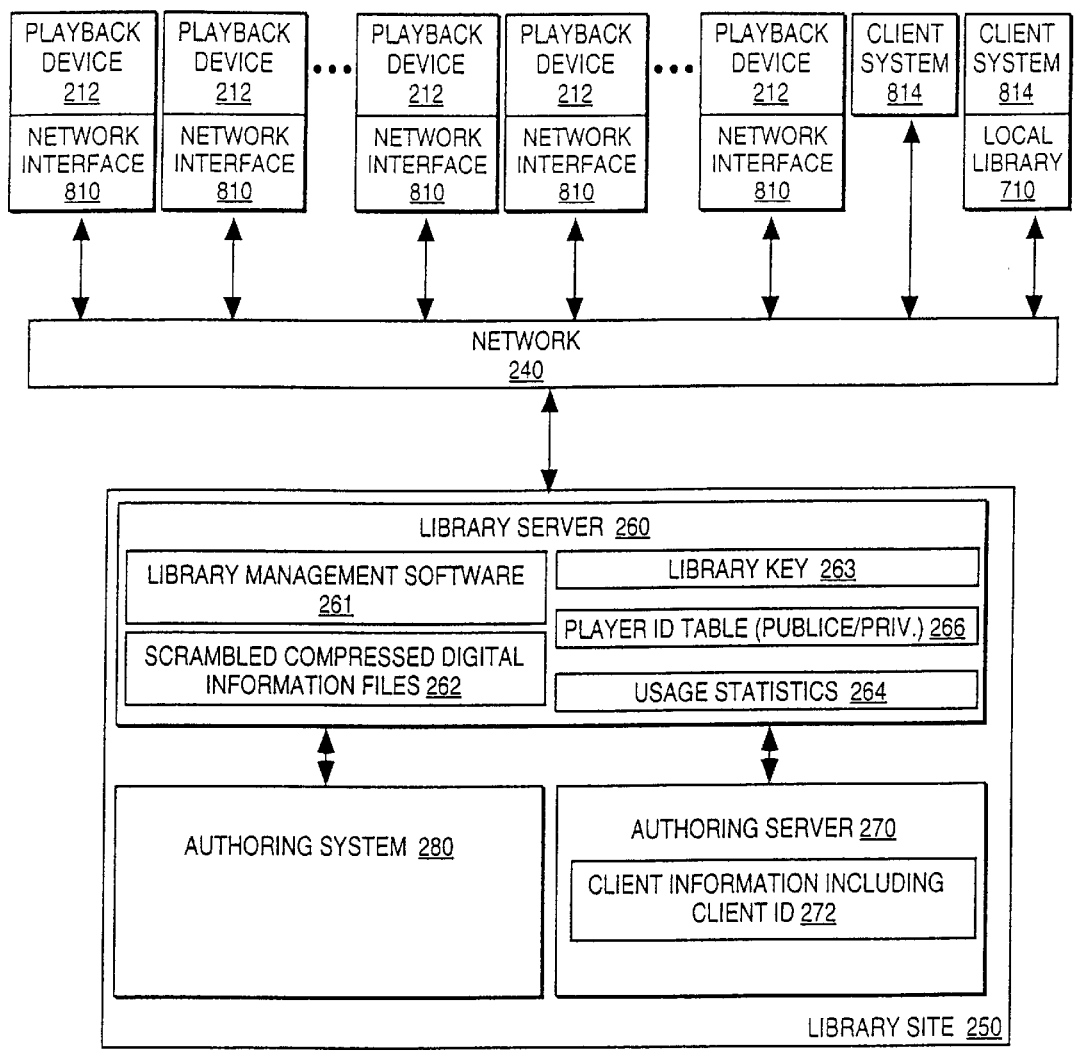
FIG. 8 illustrates an alternative embodiment wherein mobile playback devices have a direct network interface in lieu of a client computer system.

FIG. 8 illustrates another alternative embodiment of the present invention wherein the client computer system 214 is eliminated and the mobile playback device 212 is connected directly to the network 240 through network interface 810. In the preferred embodiment, the mobile playback device 212 is a minimal capability device primarily dedicated to playing audio files or displaying visual images or text on a display device. The mobile playback device 212 is minimally configured to retain its light-weight, low cost, and readily mobile features. The preferred embodiment does not therefore include the use of a portable personal computer or laptop computer; because, such devices typically do not meet the light-weight and low cost constraints of the preferred mobile playback device 212. However, the minimal mobile playback device 212 may be augmented to add network interface 810 which comprises a conventional hardware connector, hardware buffers and controllers, and firmware support for a particular conventional network protocol. For example, the mobile playback device 212 may be augmented with an integrated modem that includes a telephone jack with which the playback device may be connected to a telephone network. It will be apparent to those of ordinary skill in the art that network interface 810 may be implemented in a low cost and light-weight device such as mobile playback device 212. Because the client system browser 219 would not be available in the alternative embodiment shown in FIG. 8, a simplified user interface may be provided in firmware or other non-volatile memory of mobile playback device 212 with which the user may select items of digital information for download and playback from library server 260. As described above, the authentication process to validate the link between the mobile playback device 212 and the library server 260 must also be performed prior to user access to the library server 260 content. Alternatively, a client system 814 coupled to a network 240 may be provided to support client browser 219 and thereby enable selection of items of digital information for download and playback from library server 260 directly to any of the mobile playback devices 212. Client systems 814 may support local storage of digital information, software, and configuration data in a form similar to storage space 220 or local library 710. In addition, a more simplified implementation of network interface 810 may be designed to communicate via network 240 to client system 814 instead of library server 260.

Figure 9:
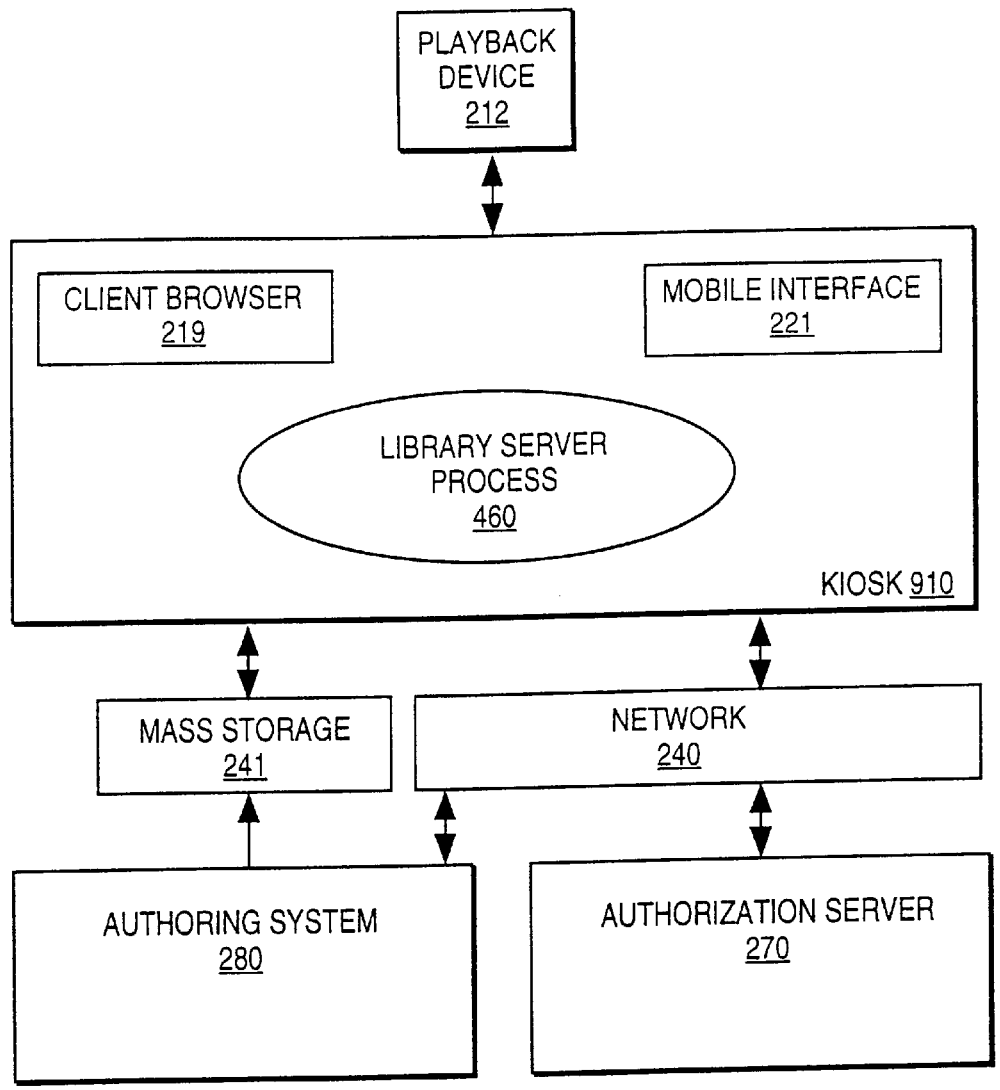
FIG. 9 illustrates an alternative embodiment wherein a kiosk is used to retain and distribute selected programming.

In another alternative embodiment of the present invention, digital information programming selections are made using the client computer system 214 and library server 260 as described above; however, the selections are delivered on mass storage medium 241. Mass storage medium 241 represents any of a variety of conventional mass storage technologies including CD-ROM, PCMCIA cards, DVDs, floppy disks, removable hard drives, digital magnetic tape, optical cards, flash memory or other optical, magnetic, electronic, or semiconductor memory devices. Upon selection by a user of a client computer system 214, selected programming is targeted and scrambled as described above and transferred to a selected mass storage medium 241 and mailed, hand-delivered, or held for pickup by the user. Once the user takes physical possession of the selected mass storage media 241, the selected programming may be read from the mass storage medium 241 by the client browser 219 and thereafter transferred to the mobile playback device 212 as described above. FIG. 9 illustrates another embodiment of the system that does not include the use of client computer 214 to transfer data to mobile playback device 212. Kiosk 910 consists of a computer system such as the one described above in FIG. 1. Kiosk 910 is a publicly accessible unit that can perform browse, content purchase, and download functions in a manner equivalent to a client computer system 214. The kiosk 910 is special because it contains its own library server for fast local access and download of content. Kiosk 910 contains a mobile device interface 221, a special version of client browser 219, and local library server process 460. Kiosk library server process 460 has local storage of scrambled and compressed digital information files 262. These compressed information files 262 originate from remote authoring system 280 and may be delivered via physical transport of mass storage media 241 or via distribution network 240. A customer operates client browser 219 to browse, select, and purchase digital information files that are delivered to the customer's mobile playback device 212. Authentication, targeting, and download processes are performed within the kiosk by library server process 460 that is connected to remote authorization server 270 over network 240. In a related embodiment, FIG. 7 shows a client system 214 with local library 710 that can be converted into a kiosk with functionality similar to kiosk 910. In this system, a special version of client browser 219 provides the same user functionality as the previous kiosk embodiment.

Figure 10:
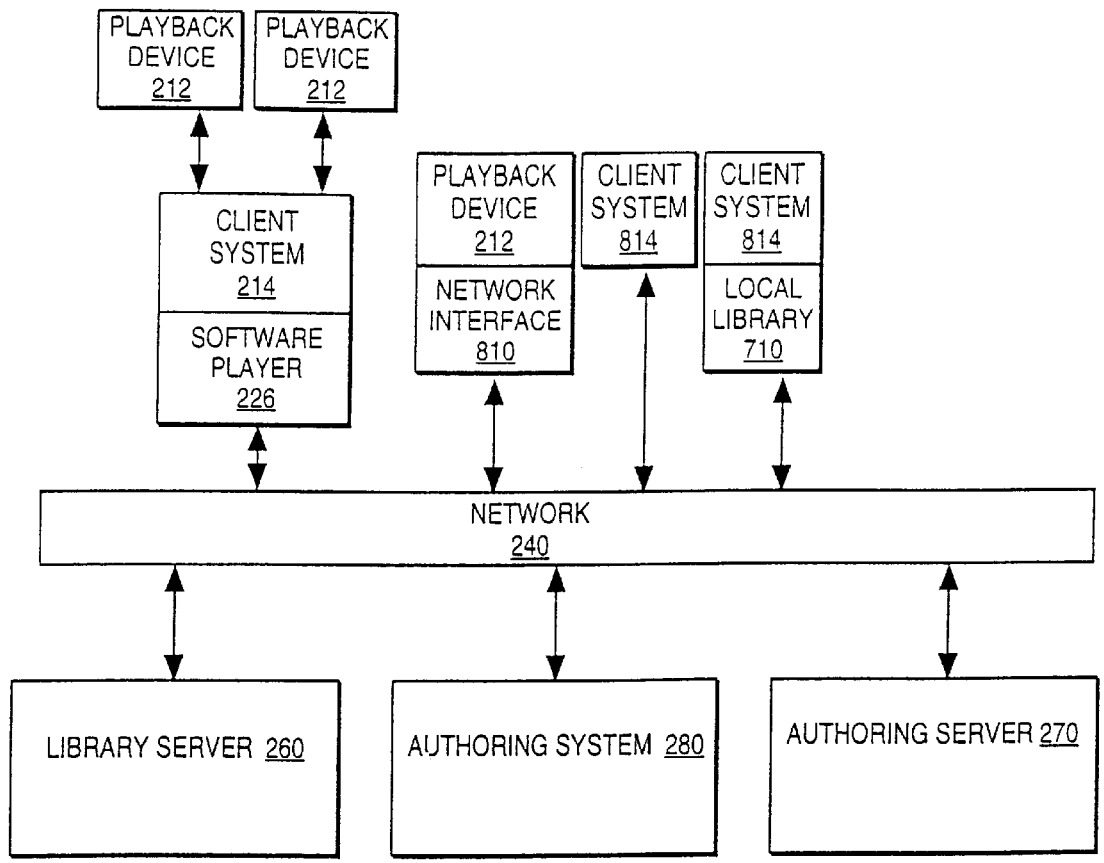
FIG. 10 illustrates an alternative embodiment wherein all system components are connected through a common network.

An alternate embodiment of the system uses a common communication network to connect all system components. In FIG. 10, network 240 is directly coupled to client system 214 and 814, network interface(s) 810, library server(s) 260, authorization server 270, and authoring system(s) 280. One of ordinary skill in the art will realize that network 240 can also be segmented into a number of independent networks or communication links without changing the functionality of the system.

As described above, mobile playback devices 212 are intended to play only authorized digital information content. Each mobile playback device 212 is embedded with a unique player ID and may optionally include one or more group ID values. A candidate digital information file is embedded with one or more player IDs and group IDs. The embedded software of the mobile playback device 212 inspects the list of player IDs and group IDs embedded in the candidate digital information file, and if at least one of the player IDs or group IDs matches the mobile playback device 212 player ID or group IDs, the mobile playback device 212 will proceed to play the digital information file. If no match is found, the mobile playback device 212 will not play the digital information file.

The assignment of a player ID to a mobile playback device 212 is preferably performed at the time of manufacture of the mobile playback device 212. Assignment of a group ID to a mobile playback device 212 can happen at different times for different reasons. Typically, a user who is accessing digital information files from the digital information library is assigned a single group ID associated with the user's account, and that group ID is embedded in the user's mobile playback device. Group IDs can be embedded in groups of playback devices, corresponding to the devices maintained by a company, or those of a single account holder, or in players owned by members of a special interest group or club.

In practice, a digital information file is embedded with a user's account specific group ID when the user purchases access to the digital information file, and that specific version of the digital information file is made available to the user.

Figure 11:
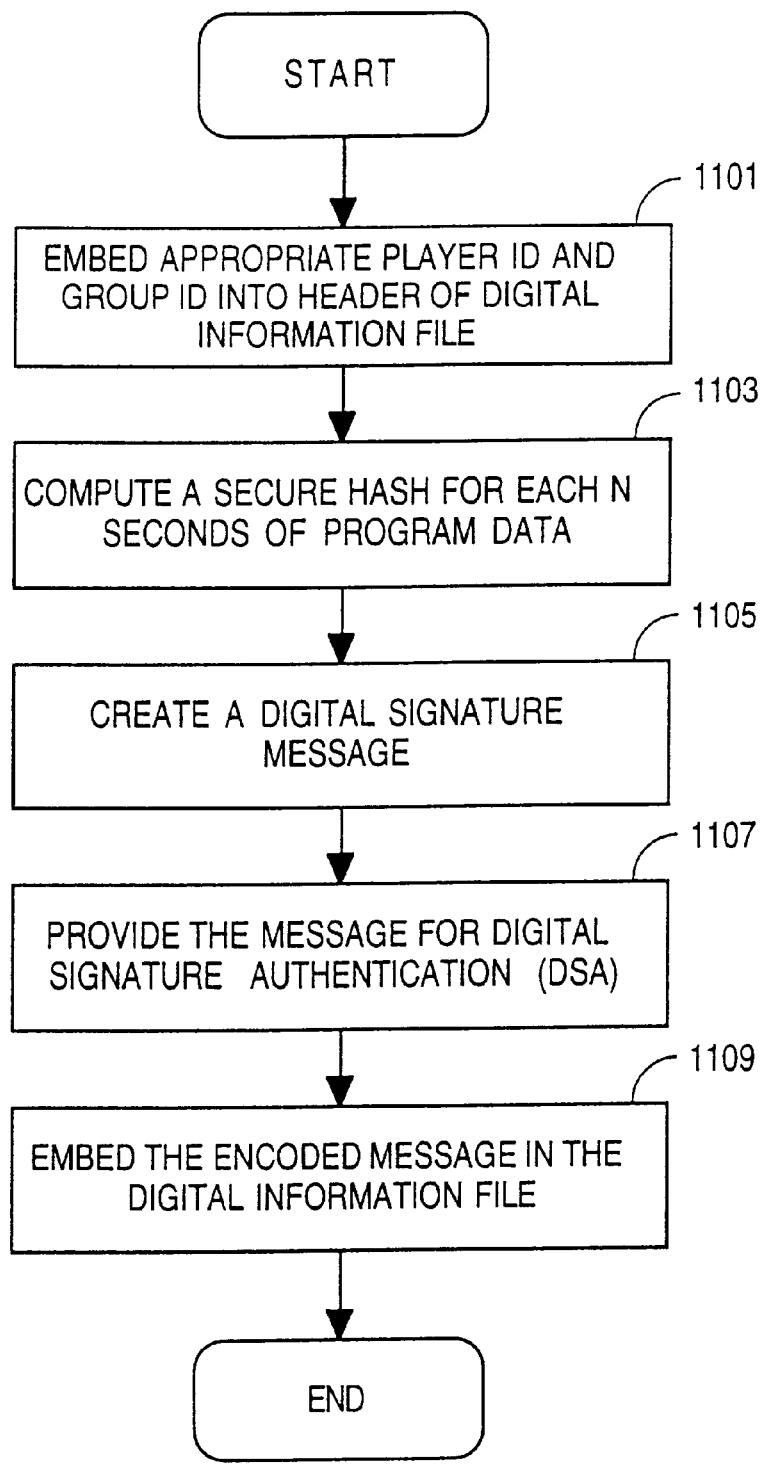
FIG. 11 illustrates a flowchart of a security scheme using the digital signature standard (DSS) compatible with the present invention.

In order to insure that a specific digital information file with embedded player IDs and group IDs cannot be altered to subvert the intent of the targeting, a security scheme using the digital signature standard (DSS) is preferably implemented as shown in FIG. 11. At 1101, the header of a digital information file to be targeted is embedded with the appropriate player IDs and Group IDs. For each n seconds of program data, a secure hash using a secure hash algorithm (SHA) is computed at 1103. At 1105, a digital signature message is created that includes relevant data associated with the digital information file being targeted. Such information may include, but is not limited to, the following information items:

Program header version number
Hash algorithm version number
Program serial number
Hash block size
Player ID count
Player ID list
Group ID count
Group ID list
Hash table count
Hash values It will be recognized that entries may be added to or removed from the above list of information items without loss of compatibility with the present invention. At 1107, the message is provided for digital signature authentication (DSA), and the resulting digital signature is embedded into the digital information file at 1109.

Figure 12:
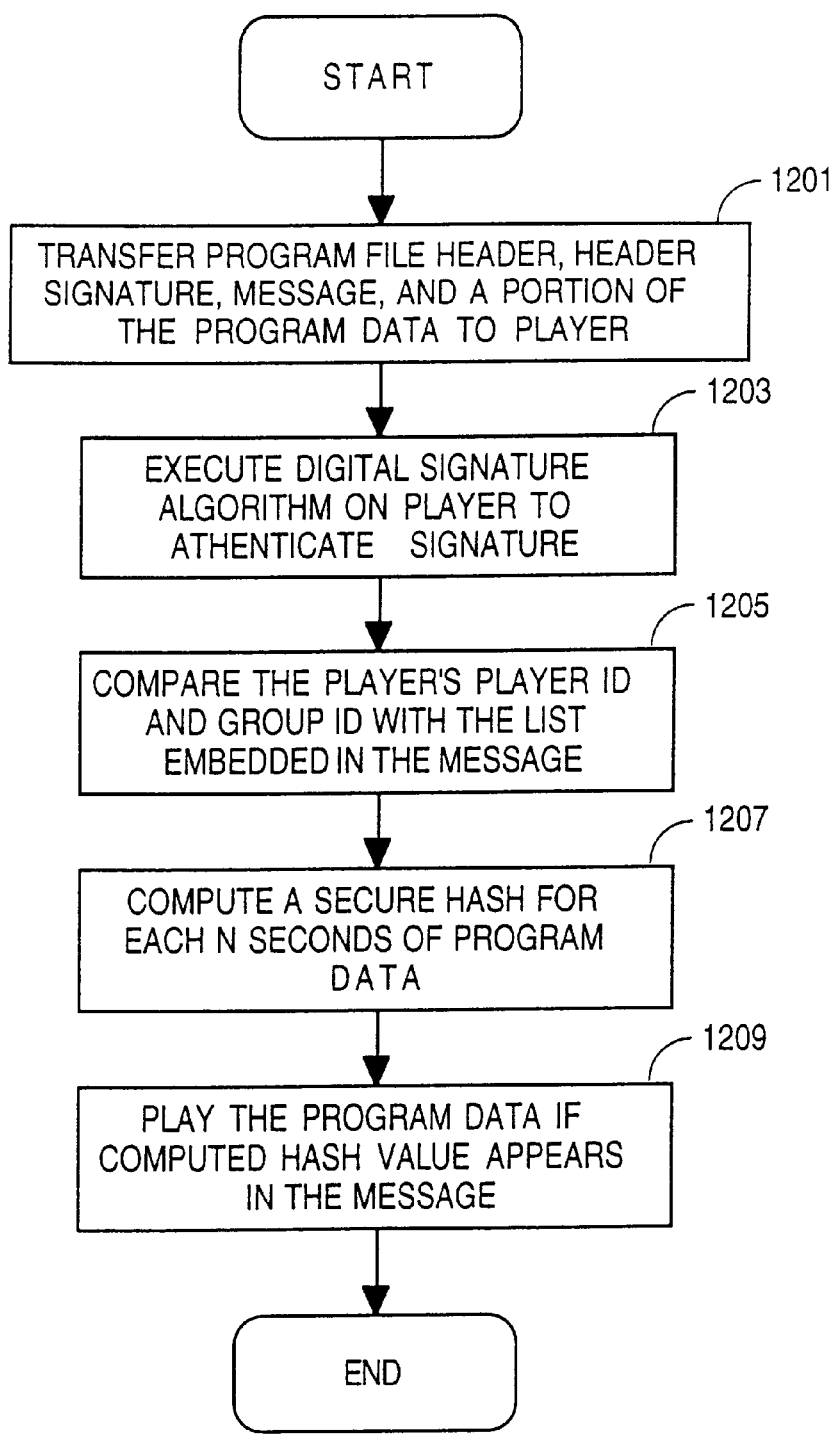
FIG. 12 illustrates a flowchart of a player security scheme using a digital signature authentication (DSA) compatible with the present invention.

A preferred player security scheme using DSA is shown in FIG. 12. At 1201, the program file header, header signature, message and a portion of the program data is transferred to the player. After receiving the information, at 1203 the player performs DSA to authenticate the signature as having been created by the sender, typically the library server. If successful, at 1205 the player then compares the player ID and group ID of the player with the list embedded in the message. If at least one player or group ID matches, at 1207 the player computes a secure hash for each n seconds the portion of the program data transferred to the player from the library server. If each computed hash appears in the message, at 1209 the player plays the program data. It will be recognized that other player security shemes other that DSA may be used without loss of compatibility with the present invention. For example, a private key may be used in conjunction with an encyption algorithm to insure that program data orignates from an authorized source, and is valid.

Thus, a method and apparatus for implementing a computer network based digital information library system employing authentication and encryption protocols for the secure transfer of digital information library programs, software, and configuration data to a client computer system and a mobile digital information playback device removably connectable to the client computer system is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

What is claimed is:

1. A method for targeting a digital information playback device comprising:

embedding a first device identifier in the playback device;

embedding a second device identifier in a digital information file;

providing the digital information file to the playback device;

comparing the first device identifier to the second device identifier;

computing a first hash value for a section of the digital information file;

embedding the first hash value in the digital information file;

computing a second hash value when the digital information file is provided to the playback device; and playing the digital information file if the first hash value matches the second hash value and the first device identifier matches the second device identifier.

2. The method of claim 1 wherein embedding the first device identifier comprises embedding a unique identifier in the playback device.

3. The method of claim 1 wherein embedding the second device identifier comprises embedding the second device identifier in a header block of the digital information file.

4. The method of claim 1 further comprising:

recording a first group identifier in the playback device;

embedding a second group identifier in the digital information file;

comparing the first group identifier to the second group identifier; and if the first group identifier matches the second group identifier, playing the digital information file.

5. The method of claim 4 wherein recording the first group identifier comprises electronically receiving the first group identifier from a remote electronic source.

6. The method of claim 4 wherein embedding the second group identifier comprises embedding the second group identifier in a header block of the digital information file.

7. The method of claim 6 further comprising executing a digital signature algorithm to authenticate the header block.

8. The method of claim 1 further comprising executing a digital signature algorithm to authenticate the digital information file.

9. The method of claim 1 further comprising executing a digital signature algorithm to authenticate a section of the digital information file.

10. A system for targeting a digital information playback device, the system comprising:

means for embedding a first device identifier in the playback device;

means for embedding a second device identifier in a digital computer for embedding a second device identifier in a digital information file;

means for computing a first hash value for a section of the digital information file;

means for embedding the first hash value in the digital information file:

means for providing the digital information file to the playback device;

means for computing a second hash value when the digital information file is provided to the playback device;

means for executing a digital signature algorithm to authenticate a header block of the digital information file;

means for comparing the first device identifier to the second device identifier; and means for playing the digital information file if the first device identifier matches the second device identifier and if the first hash value matches the second hash value.

11. The system of claim 10 wherein the means for embedding a first device identifier further comprises means for embedding a unique identifier in the playback device.

12. The system of claim 10 wherein the means for embedding the second device identifier further comprises means for embedding the second device identifier in the header block of the digital information file.

13. The system of claim 10 further comprising:

means for recording a first group identifier in the playback device;

means for recording a second group identifier in the digital information file;

means for comparing the first group identifier to the second group identifier; and means for playing the digital information file if the first group identifier matches the second group identifier.

14. The system of claim 13 wherein the means for recording the first group identifier further comprises means for electronically receiving the first group identifier from a remote electronic source.

15. The system of claim 13 wherein the means for recording the second group identifier further comprises means for recording the second group identifier in the header block of the digital information file.

16. The system of claim 15 further comprising means for executing a digital signature algorithm to authenticate the header block of the digital information file.

17. The system of claim 10 further comprising means for executing a digital signature algorithm to authenticate a subsection of the digital information file.

18. A system for targeting an audio playback device comprising:

means for embedding a device identifier in an audio file;

means for embedding a group identifier in the audio file;

means for computing a first hash value for a section of the audio file;

means for embedding the first hash value in the audio file;

means for executing a digital signature algorithm to authenticate a header block of the audio file;

means for providing the audio file to the playback device; and means for playing the audio file if the first hash value matches the second hash value.

19. A machine-readable medium having stored thereon sequences of instructions that, when executed, cause one or more electronic devices to:

embed a first device identifier in a playback device;

embed a second device identifier in a digital information file;

provide the digital information file to the playback device;

compare the first device identifier to the second device identifier;

compute a first hash value for a section of the digital information file;

embed the first hash value in the digital information file;

compute a second hash value when the digital information file is provided to the playback device; and play the digital information file if the first hash value matches the second hash value and the first device identifier matches the second device identifier.

20. The machine-readable medium of claim 19 wherein the sequences of instruction that cause the one or more electronic devices to embed the first device identifier comprises sequences of instructions that, when executed, cause the one or more electronic devices to embed in the playback device.

21. The machine-readable medium of claim 19 wherein the sequences of instructions that cause the one or more electronic devices to embed the second device identifier comprises sequences of instructions that, when executed, cause the one or more electronic devices to embed the second device identifier in a header block of the digital information file.

22. The machine-readable medium of claim 19 further comprising sequences of instructions that, when executed, cause the one or more electronic devices to:

record a first group identifier in the playback device;

embed a second group identifier in the digital information file;

compare the first group identifier to the second group identifier; and play the digital information file, if the first group identifier matches the second group identifier.

23. The machine-readable medium of claim 22 wherein the sequences of instructions that cause the one or more electronic devices to record the first group identifier comprise sequences of instructions that, when executed, cause the one or more electronic devices to receive the first group identifier from a remote source.

24. The machine-readable medium of claim 23 wherein the sequences of instructions that cause the one or more electronic devices to embed the second group identifier comprise sequences of instructions that, when executed, cause the one or more electronic devices to embed the second group identifier in a header block of the digital information file.

25. The machine-readable medium of claim 24 further comprising sequences of instructions that, when executed, cause the one or more electronic devices to execute a digital signature algorithm to authenticate the header block.

26. The machine-readable medium of claim 19 further comprising sequences of instructions that, when executed, cause the one or more electronic devices to execute a digital signature algorithm to authenticate the digital information file.

27. The machine-readable medium of claim 19 further comprising sequences of instructions that, when executed, cause the one or more electronic devices to execute a digital signature algorithm to authenticate a section of the digital information file.

* * * * *